United States Patent
Sung et al.

(10) Patent No.: US 9,794,939 B1
(45) Date of Patent: Oct. 17, 2017

(54) SYSTEMS AND METHODS FOR SUB-BAND SELECTION FOR A WIRELESS DEVICE DURING CONNECTION

(71) Applicant: Sprint Spectrum LP, Overland Park, KS (US)

(72) Inventors: Sanghoon Sung, Ashburn, VA (US); Yun Sung Kim, Ashburn, VA (US); Pinal Tailor, Ashburn, VA (US); Siddhartha Chenumolu, Broadlands, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 133 days.

(21) Appl. No.: 14/706,214

(22) Filed: May 7, 2015

(51) Int. Cl.
  *H04W 72/04* (2009.01)
  *H04W 72/08* (2009.01)
  *H04L 5/00* (2006.01)

(52) U.S. Cl.
  CPC ....... *H04W 72/0453* (2013.01); *H04L 5/0048* (2013.01); *H04L 5/0057* (2013.01); *H04W 72/085* (2013.01)

(58) Field of Classification Search
  None
  See application file for complete search history.

(56) References Cited

U.S. PATENT DOCUMENTS

| | | | |
|---|---|---|---|
| 8,521,166 B2 | 8/2013 | Kang et al. | |
| 2007/0248046 A1* | 10/2007 | Khan | H04W 72/04 370/329 |
| 2008/0013500 A1* | 1/2008 | Laroia | H04B 7/2621 370/338 |
| 2009/0168718 A1* | 7/2009 | Wang | H04L 1/0026 370/330 |
| 2009/0274224 A1* | 11/2009 | Harris | H04L 1/003 375/260 |
| 2009/0316676 A1* | 12/2009 | Kolding | H04L 1/0026 370/345 |
| 2011/0211541 A1 | 9/2011 | Yuk et al. | |
| 2013/0337822 A1* | 12/2013 | Rubin | H04W 72/12 455/452.1 |
| 2014/0126460 A1* | 5/2014 | Bienas | H04W 74/002 370/315 |
| 2014/0177607 A1* | 6/2014 | Li | H04W 74/0833 370/336 |
| 2015/0131576 A1* | 5/2015 | Seo | H04L 5/0064 370/329 |

* cited by examiner

*Primary Examiner* — Diane Lo

(57) ABSTRACT

Systems and methods are described for sub-band selection for a wireless device during connection. An access node may receive a RACH preamble message from a wireless device. It may be determined that a received signal level associated with the message does not meet a signal level criteria. The wireless device may be instructed to transmit signal information to the access node. A sub-band that comprises a signal level that meets the signal level criteria may be selected. The wireless device may then be instructed to communicate with the access node using the selected sub-band when requesting a connection.

18 Claims, 9 Drawing Sheets

… (1)

SYSTEMS AND METHODS FOR SUB-BAND SELECTION FOR A WIRELESS DEVICE DURING CONNECTION

TECHNICAL BACKGROUND

Telecommunication systems, such as cellular networks or other wireless networks, use various network links throughout the network to communicate. For example, an access node may use a network link to communicate with another access node while using a separate network link to communicate with another processing node. Accordingly, the system may rely on a well-established network to provide efficient communication services.

In certain circumstances, a portion of the network may experience high load (e.g., load above a threshold) or poor channel conditions. For example, a communication link may experience large amount of data traffic or poor channel conditions may render a communication link less effective, and the efficiency of the system may suffer. Accordingly, a system that effectively balances load and considers channel conditions may be able to provide a high quality service to users of the system.

OVERVIEW

Systems and methods are described for sub-band selection for a wireless device during connection. An access node may receive a RACH preamble message from a wireless device. It may be determined that a received signal level associated with the message does not meet a signal level criteria. The wireless device may be instructed to transmit signal information to the access node. A sub-band that comprises a signal level that meets the signal level criteria may be selected. The wireless device may then be instructed to communicate with the access node using the selected sub-band when requesting a connection.

DETAILED DESCRIPTION

Wireless devices that attempt to establish a connection with an access node may experience a variety of channel conditions. In some instances, the channel conditions may be poor (e.g., below a threshold), and thus the performance of a RACH procedure may suffer and an eventual connection to the access node may be inefficient or may not be established at all.

In an embodiment, one or more sub-bands may be selected for a wireless device during a connection process (e.g., with an access node). An access node may receive a RACH preamble message from the wireless device. It may be determined that a received signal level associated with the message does not meet a signal level criteria. The wireless device may then be instructed to transmit signal information to the access node. In an embodiment, the signal information may comprise a sub-band channel quality indicator (CQI) report or may comprise an instruction to transmit a signal on a plurality of sub-bands. A sub-band that comprises a signal level that meets the signal level criteria may then be selected, and the wireless device may perform the connection process using the selected sub-band.

Figure 1:
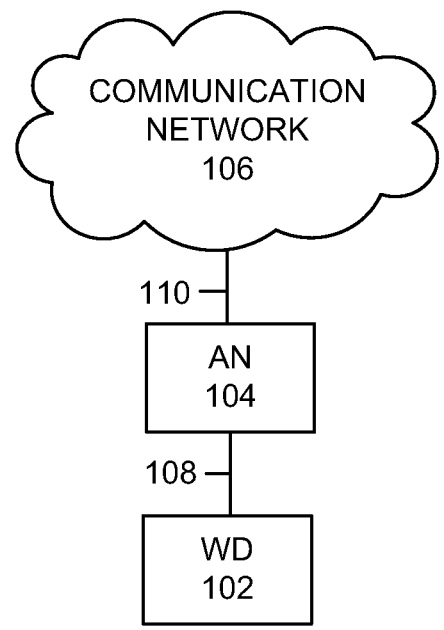
FIG. 1 illustrates an exemplary communication system for sub-band selection for a wireless device during connection.

FIG. 1 illustrates an exemplary communication system for sub-band selection for a wireless device during connection comprising wireless device 102, access node 104, communication network 106, and communication links 108 and 110. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with access node 104, any number of wireless devices can be implemented.

Access node 104 is a network node capable of providing wireless communications to wireless device 102, and can be, for example, a base transceiver station, a radio base station, and an eNodeB device. Access node 104 may communicate with communication network 106 over communication link 110. Although only access node 104 is illustrated in FIG. 1, wireless device 102 (and other wireless devices not depicted) can be in communication with a plurality of access nodes and/or small cells. The plurality of access nodes and/or small cells can be associated with different networks and can support different communication protocols and radio access technologies.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also comprise a wireless network, including base stations, wireless communication nodes, telephony switches, internet routers, network gateways, computer systems, communication links, or some other type of communication equipment, and combinations thereof.

Communication links 108 and 110 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

In an embodiment, system 100 may use a plurality of carriers in order to provide wireless communication services. A plurality of carriers that comprise bandwidth for wireless communications (e.g., 2.5 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. Access node 104 may transmit wireless signals over one or more particular band classes (BCs). A band class may comprise a block of wireless spectrum. In an embodiment, a frequency band may comprise a band class. Examples of such band classes may be blocks of spectrum at 800 MHz, 1,900 MHz, and 2,500 MHz In operation, access node 104 may provide wireless services to wireless devices using one or more frequency bands (e.g., sub-bands), and wireless device 102 may attempt to initiate communication with access node 104 in order to receive wireless services from the access node. For example, wireless device 102 may initiate a Random Access Procedure (e.g., RACH) in order to establish a connection with access node 104. The wireless device may transmit one or more messages over a Physical Random Access Channel (PRACH) in order to perform the RACH procedure.

In an embodiment, wireless devices that attempt to establish a connection to access node 104 may experience a variety of channel conditions. In some instances, the channel conditions may be poor (e.g., below a threshold), and thus the performance of a RACH procedure may suffer and an eventual connection to the access node may be inefficient or may not be established at all. Accordingly, a system that considers channel conditions and mitigates against such considerations may be able to provide enhanced wireless services.

Figure 2:
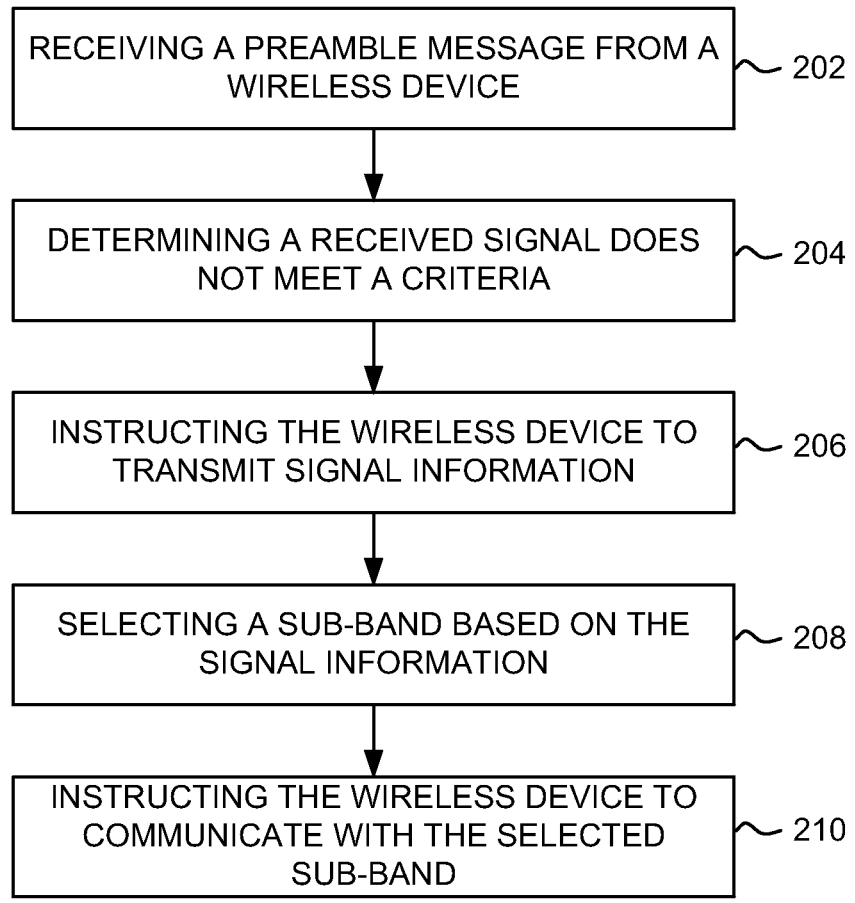
FIG. 2 illustrates an exemplary method for sub-band selection for a wireless device during connection.

FIG. 2 illustrates an exemplary method for sub-band selection for a wireless device during connection. The method will be discussed with reference to the exemplary communication system 100 illustrated in FIG. 1, however, the method can be implemented with any suitable communication system.

Referring to FIG. 2, at step 202, a preamble message is received at an access node from a wireless device. For example, a preamble message may be received at access node 104 from wireless device 102. The preamble message may comprise a RACH preamble index. For example, wireless device 102 may transmit a preamble message based on System Information Block (SIB) data received from an access node 104 broadcast.

At step 204, it may be determined that a received signal level associated with the preamble message does not meet a signal level criteria. For example, wireless device 102 may transmit the preamble over a first sub-band. Access node 104 may receive the transmission over the first sub-band at a received signal level (e.g., signal to interference plus noise ratio, SINR). The received signal level may be compared to a signal level criteria (e.g., SINR threshold). It may be determined that the received signal level does not meet the signal level criteria (e.g., is less than the SINR threshold).

At step 206, the wireless device may be instructed to transmit signal information to the access node. For example, wireless device 102 may be instructed to transmit signal information to access node 104. In an embodiment, the signal information may comprise a sub-band channel quality indicator (CQI) report that comprises CQIs for a plurality of sub-bands. In another embodiment, the instruction to transmit signal information may comprise an instruction to transmit signals over a plurality of sub-bands (e.g., sounding reference signals).

At step 208, a sub-band that comprises a signal level that meets the signal level criteria may be selected. For example, where a CQI report is received from wireless device 102, a sub-band that comprises a CQI that meets the signal level criteria (e.g., CQI threshold) may be selected. In an embodiment where wireless device 102 is instructed to transmit transmissions over a plurality of sub-bands, the transmissions may each be received at a received signal level (e.g., SINR). A sub-band that comprises a received signal level that meets the signal level criteria (e.g., SINR threshold) may be selected.

At step 210, the wireless device may be instructed to communicate with the access node using the selected sub-band when requesting a connection. For example, wireless device 102 may be instructed to communicate with access node 104 using the selected sub-band when requesting a connection. In an embodiment, wireless device 102 may transmit an RRC connection request over the selected sub-band in response to the instruction to communicate over the selected sub-band.

Figure 3:
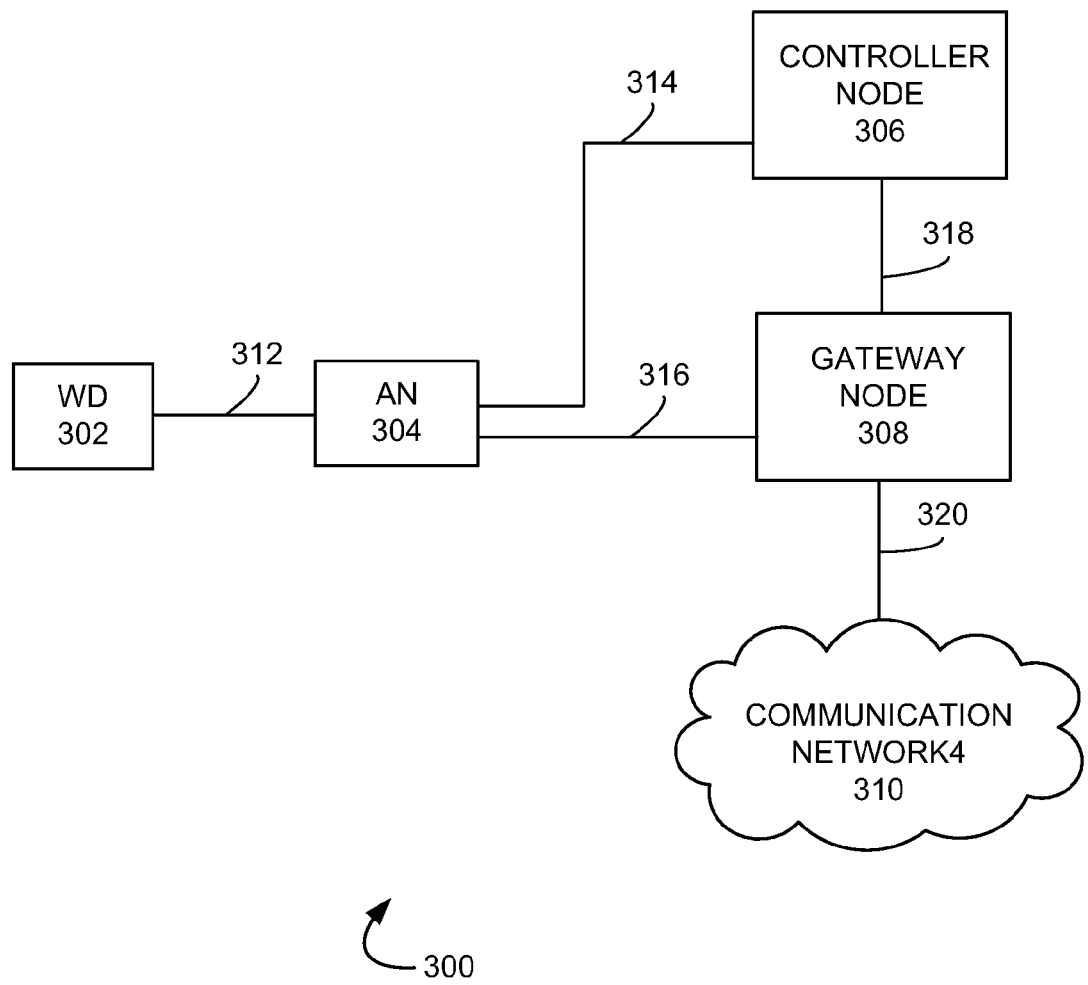
FIG. 3 illustrates another exemplary system for sub-band selection for a wireless device during connection.

FIG. 3 illustrates another exemplary communication system 300 for sub-band selection for a wireless device during connection. Communication system 300 may comprise wireless device 302, access node 304, controller node 306, gateway node 308, communication network 310, and communication links 312, 314, 316, 318, and 320. Other network elements may be present in the communication system 300 to facilitate communication but are omitted for clarity, such as base stations, base station controllers, gateways, mobile switching centers, dispatch application processors, and location registers such as a home location register or visitor location register.

Wireless device 302 can be any device configured to communicate over communication system 300 using a wireless communication link. For example, wireless device 302 can include a cell phone, a smart phone, a computing platform such as a laptop, palmtop, or a tablet, a personal digital assistant, or an internet access device, and combinations thereof.

Access node 304 is a network node capable of providing wireless communications to wireless device 302, and can be, for example, a base transceiver station, a radio base station, or an eNodeB device. Access nodes 304 may communicate with controller node 306 over communication link 314, and with gateway node 308 over communication link 316.

Controller node 306 can be any network node configured to manage services within system 300. Controller node 306 may provide other control and management functions for system 300. The controller node 306 can be a single device having various functions or a plurality of devices having differing functions. For example, controller node 306 can include at least one of a multi-cell/multicast coordination entity (MCE), a mobility management entity (MME), a mobile switching center (MSC), a radio network controller (RNC), and a combination thereof.

Controller node 306 can comprise a processor and associated circuitry to execute or direct the execution of computer-readable instructions to obtain information. Controller node 306 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 306 can receive instructions and other input at a user interface. Controller node 306 can comprise a processor and associated circuitry to execute or direct the execution of computer-readable instructions to obtain information.

Gateway node 308 is a network element which can comprise a processor and associated circuitry to execute or direct the execution of computer-readable instructions. Gateway node 308 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 308 can provide instructions to access node 304 related to channel selection in communications with wireless device 302. For example, gateway node 308 can comprise at least one of a serving gateway (SGW), a packet data network gateway (PDNGW), a cellular gateway (CGW), and a combination thereof.

Communication network 310 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 310 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 310 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 312, 314, 316, 318, and 320 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 304, controller node 306, gateway node 308, and communication network 310 which are omitted for clarity, including additional processing nodes, routers, gateways, and physical and/or wireless data links for carrying data among the various network elements. In an embodiment, any of controller node 306, gateway node 310, and one or more modules of access nodes 304 may perform all or parts of the methods of FIGS. 2, 5, and 7.

In an embodiment, system 300 may use a plurality of carriers in order to provide wireless communication services. A plurality of carriers that comprise bandwidth for wireless communications (e.g., 2.5 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. Access node 104 may transmit wireless signals over one or more particular band classes (BCs). A band class may comprise a block of wireless spectrum. In an embodiment, a frequency band may comprise a band class. Examples of such band classes may be blocks of spectrum at 800 MHz, 1,900 MHz, and 2,500 MHz In operation, access node 304 may provide wireless services to wireless devices using one or more frequency bands (e.g., sub-bands), and wireless device 302 may attempt to initiate communication with access node 304 in order to receive wireless services from the access node. For example, wireless device 302 may initiate a Random Access Procedure (e.g., RACH) in order to establish a connection with access node 304. The wireless device may transmit one or more message over a Physical Random Access Channel (PRACH) in order to perform the RACH procedure.

In an embodiment, wireless devices that attempt to establish a connection to access node 304 may experience a variety of channel conditions. In some instances, the channel conditions may be poor (e.g., below a threshold), and thus the performance of a RACH procedure may suffer and an eventual connection to the access node may be inefficient or may not be established at all. Accordingly, a system that considers channel conditions and mitigates against such considerations may be able to provide enhanced wireless services.

Figure 4:
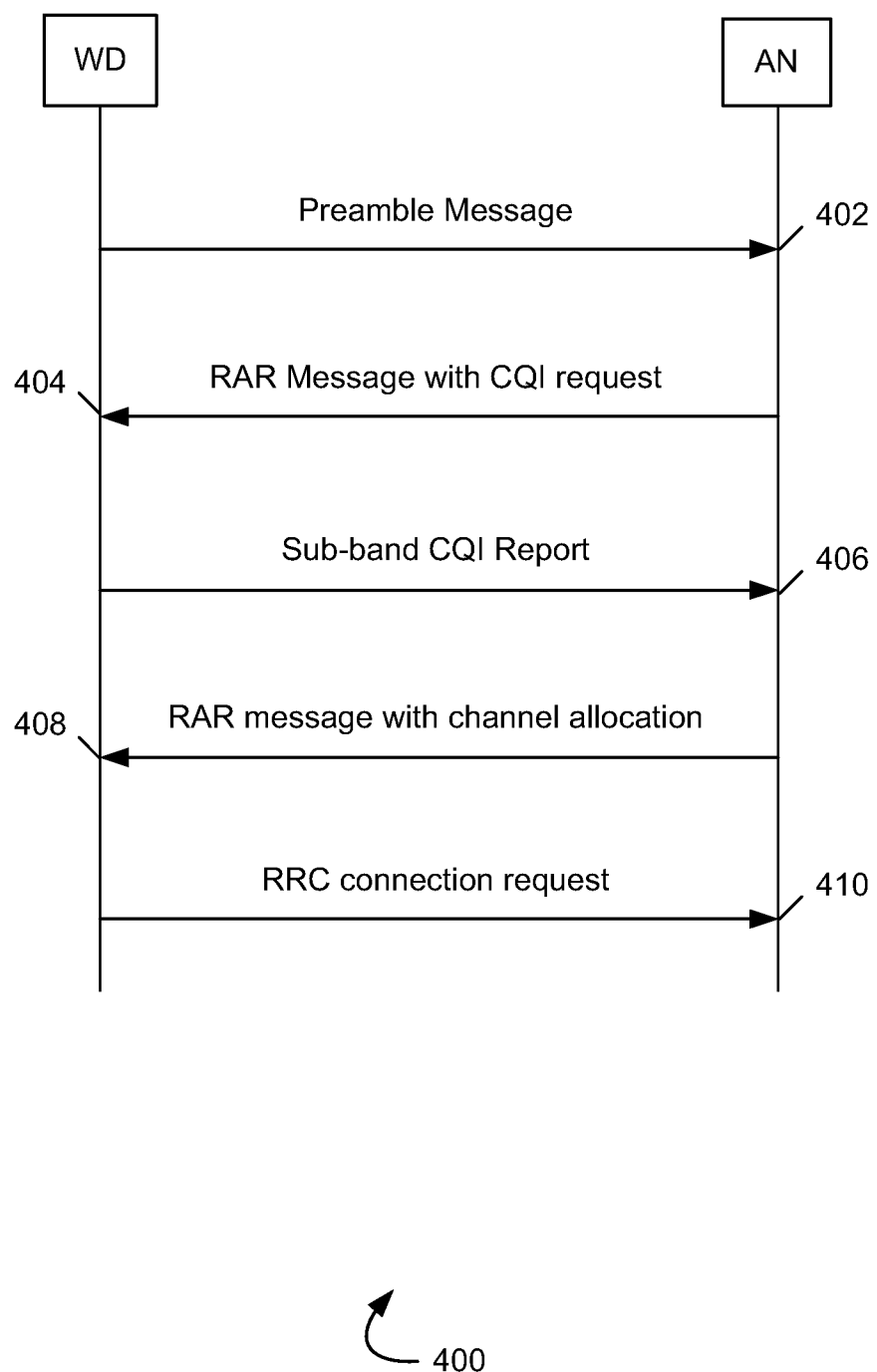
FIG. 4 illustrates an exemplary communication flow for sub-band selection for a wireless device during connection.

FIG. 4 illustrates an exemplary communication flow for sub-band selection for a wireless device during connection. The transmissions illustrated may be performed by wireless device 302 and access node 304 of FIG. 3. In an embodiment, the transmission flow 400 may be used to establish communication between a wireless device and an access node using a time domain duplexing (TDD) communication scheme.

Figure 5:
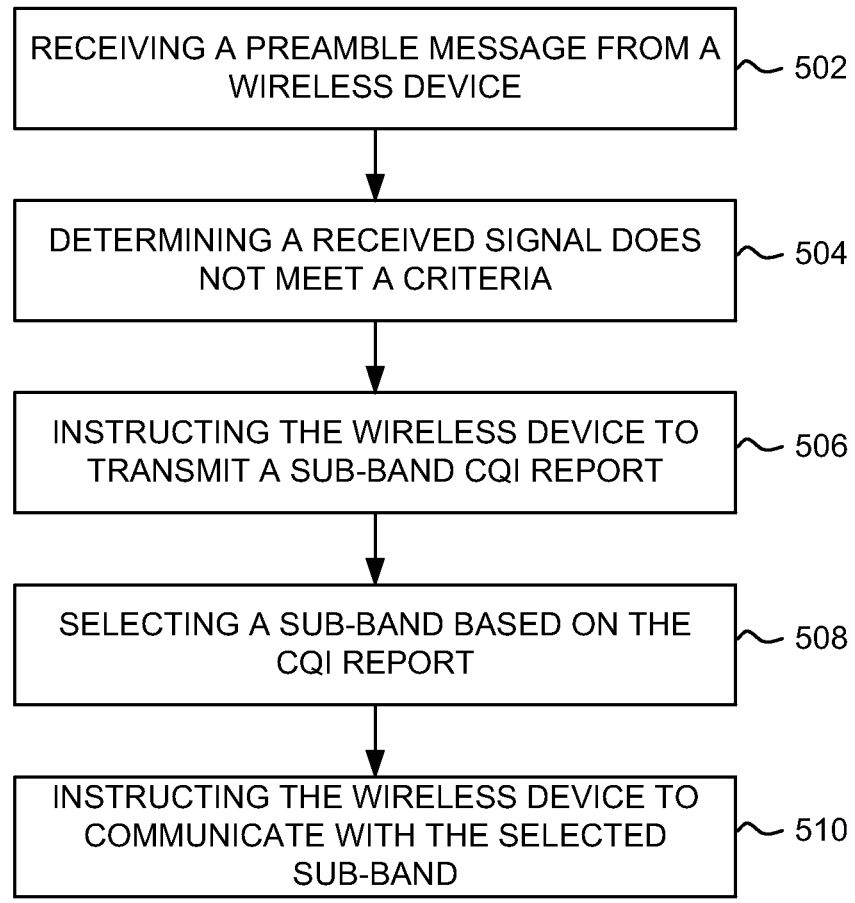
FIG. 5 illustrates another exemplary communication method for sub-band selection for a wireless device during connection.

FIG. 5 illustrates an exemplary method for sub-band selection for a wireless device during connection. The method will be discussed with reference to the exemplary communication system 300 illustrated in FIG. 3 and exemplary communication flow 400 illustrated in FIG. 4, however, the method can be implemented with any suitable communication system and may implement any suitable communication flow.

Referring to FIG. 5, at step 502, a preamble message is received at an access node from a wireless device. For example, a preamble message may be received at access node 304 from wireless device 302. The preamble message may comprise a RACH preamble index. For example, wireless device 302 may transmit a preamble message based on System Information Block (SIB) data received from an access node 304 broadcast.

In an embodiment, the RACH preamble index may indicate a resource requirement for wireless device 302. The preamble message may be transmitted over the Physical Random Access Channel (PRACH). In an embodiment, wireless device 302 man transmit the preamble message to attach to communication network 310 or based on a switch from idle mode to active mode.

In an embodiment, wireless device 302 and access node 304 may implement a TDD communication scheme. Transmission 402 of FIG. 4 may illustrate the preamble message communication.

At step 504, it may be determined that a received signal level associated with the preamble message does not meet a signal level criteria. For example, wireless device 302 may transmit the preamble over a first sub-band. Access node 304 may receive the transmission over the first sub-band at a received signal level (e.g., signal to interference plus noise ratio, SINR). The received signal level may be compared to a signal level criteria (e.g., SINR threshold). It may be determined that the received signal level does not meet the signal level criteria (e.g., is less than the SINR threshold).

In an embodiment, the signal level criteria (e.g., SINR threshold) may be determined based on previous RACH communications with wireless devices at access node 304. For example, the signal levels for received RACH preamble messages from wireless devices that failed to result in an established connection with access node 304 may be monitored, and the signal level criteria may be based on the monitored signal levels.

At step 506, the wireless device may be instructed to transmit signal information to the access node. For example, wireless device 302 may be instructed to transmit signal information to access node 304. The instruction may be transmitted based on the determination that the received signal level for the preamble message does not meet the signal level criteria.

In an embodiment, the instruction to transmit signal information may comprise an instruction to transmit a channel quality indicator (CQI) sub-band report. For example, wireless device 302, when implementing a TDD communication scheme, may be capable of scanning a plurality of sub-bands (e.g., sub-bands comprising a channel width) and determining CQIs for each sub-band. Subsequently wireless device 302 may transmit a CQI sub-band report to access node 304 that comprises the CQIs for each sub-band.

In an embodiment, the instruction may be transmitted by access node 304, wherein the instruction comprises a Random Access Response (RAR) message. Transmission 404 of FIG. 4 may illustrate the instruction to transmit the CQI report.

At step 508, a sub-band that comprises a signal level that meets the signal level criteria may be selected. For example, where wireless device 302 is instructed to transmit a sub-band CQI report, the selected sub-band may be based on the CQI report received at access node 304. Transmission 406 of FIG. 4 may illustrate the CQI report communication. A sub-band that comprises a CQI level that meets the signal level criteria (e.g., SINR threshold, or converted CQI threshold) may be selected. In an embodiment, the sub-band that comprises the greatest CQI in the CQI report may be selected.

At step 510, the wireless device may be instructed to communicate with the access node using the selected sub-band when requesting a connection. For example, wireless device 302 may be instructed to communicate with access node 304 using the selected sub-band when requesting a connection. In an embodiment, the instruction may be transmitted by access node 304, wherein the instruction comprises a Random Access Response (RAR) message. Transmissions 408 of FIG. 4 may illustrate instruction to communicate using the selected sub-band.

In an embodiment, wireless device 302 may transmit an RRC connection request over the selected sub-band in response to the instruction to communicate over the selected sub-band. Such an RRC request may be illustrated by RRC connection request 410 of FIG. 4.

Figure 6:
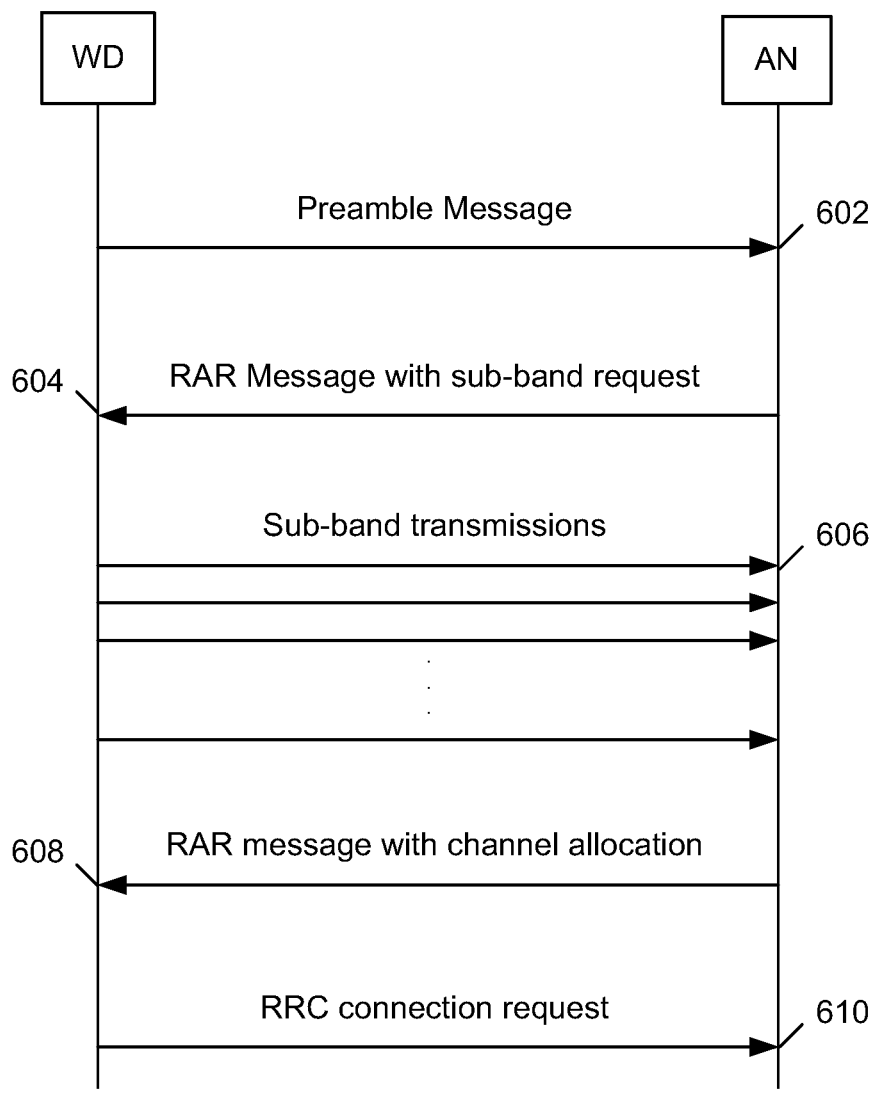
FIG. 6 illustrates another exemplary communication flow for sub-band selection for a wireless device during connection.

FIG. 6 illustrates an exemplary communication flow for sub-band selection for a wireless device during connection. The transmissions illustrated may be performed by wireless device 302 and access node 304 of FIG. 3. In an embodiment, the transmission flow 600 may be used to establish communication between a wireless device and an access node using a frequency domain duplexing (FDD) communication scheme or a timed domain duplexing (TDD) communication scheme.

Figure 7:
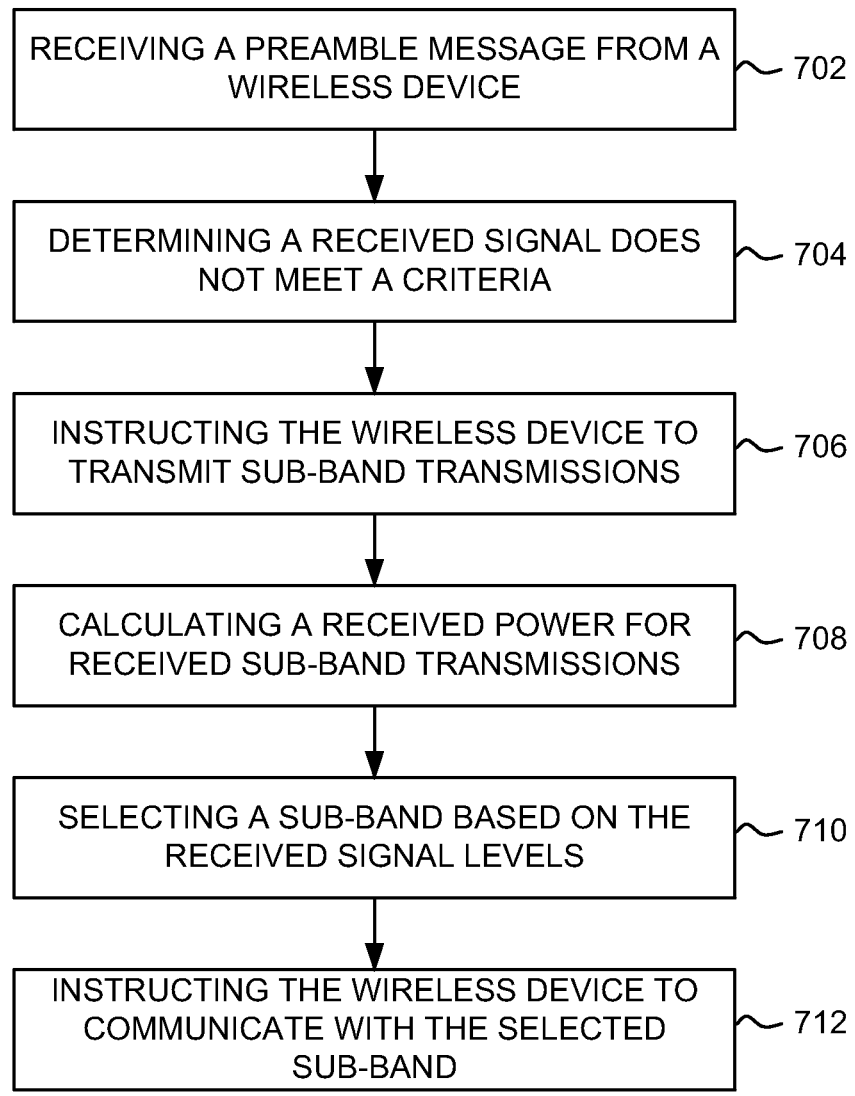
FIG. 7 illustrates another exemplary communication method for sub-band selection for a wireless device during connection.

FIG. 7 illustrates an exemplary method for sub-band selection for a wireless device during connection. The method will be discussed with reference to the exemplary communication system 300 illustrated in FIG. 3 and exemplary communication flow 600 illustrated in FIG. 6, however, the method can be implemented with any suitable communication system and may implement any suitable communication flow.

Referring to FIG. 7, at step 702, a preamble message is received at an access node from a wireless device. For example, a preamble message may be received at access node 304 from wireless device 302. The preamble message may comprise a RACH preamble index. For example, wireless device 302 may transmit a preamble message based on System Information Block (SIB) data received from an access node 304 broadcast.

In an embodiment, the RACH preamble index may indicate a resource requirement for wireless device 302. The preamble message may be transmitted over the Physical Random Access Channel (PRACH). In an embodiment, wireless device 302 man transmit the preamble message to attach to communication network 310 or based on a switch from idle mode to active mode.

In an embodiment, wireless device 302 and access node 304 may implement a FDD communication scheme or a TDD communication scheme. Transmission 602 of FIG. 6 may illustrate the preamble message communication.

At step 704, it may be determined that a received signal level associated with the preamble message does not meet a signal level criteria. For example, wireless device 302 may transmit the preamble over a first sub-band. Access node 304 may receive the transmission over the first sub-band at a received signal level (e.g., signal to interference plus noise ratio, SINR). The received signal level may be compared to a signal level criteria (e.g., SINR threshold). It may be determined that the received signal level does not meet the signal level criteria (e.g., is less than the SINR threshold).

In an embodiment, the signal level criteria (e.g., SINR threshold) may be determined based on previous RACH communications with wireless devices at access node 304. For example, the signal levels for received RACH preamble messages from wireless devices that failed to result in an established connection with access node 304 may be monitored, and the signal level criteria may be based on the monitored signal levels.

At step 706, the wireless device may be instructed to transmit signal information to the access node. For example, wireless device 302 may be instructed to transmit signal information to access node 304. The instruction may be transmitted based on the determination that the received signal level for the preamble message does not meet a signal level criteria.

In an embodiment, the instruction to transmit signal information may comprise an instruction to transmit signals over a plurality of sub-bands (e.g., sounding reference signals). A sounding reference signal may comprise a reference signal transmitted by a wireless device (e.g., wireless device 302) over a sub-band or a plurality of sub-bands. An access node (e.g., access node 304) may receive the sounding reference signal (or a plurality of sounding reference signals) at a received signal level and subsequently determine channel state information (e.g., channel quality) relative to the wireless device for each the one or more sub-bands.

In an embodiment, wireless device 302 may be instructed to transmit one or more sounding reference signals. The instruction may be transmitted by access node 304, wherein the instruction comprises a Random Access Response (RAR) message. In an embodiment, access node 304 may instruct the wireless device to transmit one of a plurality of narrow-band SRS signals and a wide-band SRS signal.

A narrow-band SRS signal may be transmitted over a single sub-band, while a wideband SRS signal may be transmitted over a plurality of sub-bands (e.g., a channel width). In an embodiment, access node 304 may instruct wireless device 302 to transmit a plurality of narrow-band SRS signals for a subset of sub-bands in a channel. In this example, the subset of sub-bands may be determined by access node 304 based on historic channel state information for wireless devices. For example, channel state information for wireless devices in communication with access node 304 may be tracked over a period of time (e.g., hours, days, months, and the like). Based on the tracked channel state information, access node 304 may determine the subset of sub-bands. For instance, the subset of sub-bands may comprise tracked channel state information that meets a criteria (e.g., channel qualities that are greater than or equal to a threshold). Transmission 604 of FIG. 6 may illustrate the instruction.

At step 708, the wireless devices may transmit one or more signals over a plurality of sub-bands. For example, based on the instruction from access node 304, wireless device 302 may transmit one or more SRS signals over a plurality of sub-bands. Wireless device 302 may transmit a wideband SRS signal over the plurality of sub-bands or a plurality of narrowband SRS signals over the plurality of sub-bands.

Figure 8:
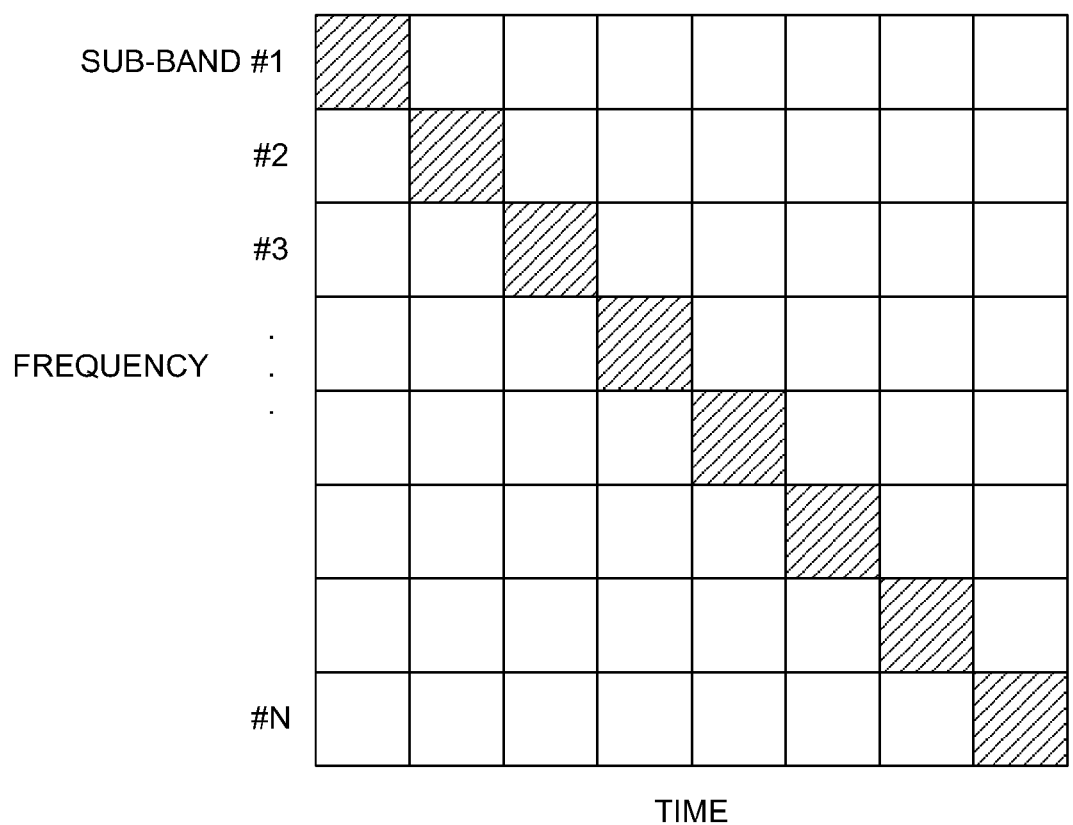
FIG. 8 illustrates an exemplary pattern of narrowband SRS transmissions using a linear hopping pattern.

In an embodiment where wireless device 302 transmits a plurality of narrow band SRS signals, the transmissions may comprise a linear hopping pattern such that a signal is transmitted over a single sub-band for a single transmission time interval. FIG. 8 illustrates narrowband SRS transmissions using a linear hopping pattern. Graph 800 represents time on the x-axis and frequency on the y-axis. Each box represents a sub-band and transmission time interval (TTI) pairing. For instance, the upper left box represents sub-band #1 during the first TTI. As illustrated, the linear hopping pattern may be implemented such that the SRS signal is transmitted over sub-band #1 for the first TTI, sub-band #2 for the second TTI, and so on. In an embodiment where wireless device 302 is instructed to transmit SRS signals over a subset of sub-bands, some sub-bands may be skipped in the linear hopping pattern.

In an embodiment, wireless device 302 may transmit a plurality of narrow band SRS transmissions, wherein the transmissions are over a subset of sub-bands that comprise a channel. For instance, access node 304 may instruct the wireless device 302 to transmit SRS signals over a subset of sub-bands. In this example, the linear hopping pattern illustrated in FIG. 8 may be implemented, where a sub-band that is not included in the subset may be skipped in the pattern. For example, sub-bands #1 and #3 may be included in the subset while sub-band #2 is not. In this example, the SRS signal may be transmitted over sub-band #1 during the first TTI and the SRS signal may be transmitted over sub-band #3 during the second TTI (e.g., skipping sub-band #2). Transmissions 606 of FIG. 6 may illustrate the sub-band transmissions (e.g., sounding reference signal transmissions).

At step 708, a received signal power for received sub-band transmissions may be calculated. For example, where wireless device 302 is instructed to transmit signals over a plurality of sub-bands, the transmissions may each be received at a received signal level (e.g., SINR). A received power for each of the sub-bands may be calculated based on the received signal level for the signal transmitted over the sub-band.

In an embodiment, the received signals (e.g., RACH signal or sounding reference signals) may be transformed using a Fast Fourier Transform (FFT), or the like, and converted using a Serial-to-Parallel converter, such that a signal level for the signal may be determined. Suppose that the total number of subcarriers that consist of either RACH signal or sounding reference signal is M. For M received subcarriers (e.g., received RACH signal or received sounding reference signal), a signal level, $Y_m$, for the m-th subcarrier may comprise: $Y_m = H_m \times X_m + I_m$. Here $Y_m$ may comprise the received signal level of the m-th subcarrier, $H_m$ may comprise the channel response, $X_m$ may comprise the pilot signal, and $I_m$ may comprise the noise and interference.

In an embodiment, received signal power for the received signals (e.g., RACH signal or sounding reference signals) may comprise:

$$P_s = \frac{1}{M} \cdot \sum_{m=1}^{M} |Y_m|^2 - P_I$$

Here, $P_s$ may comprise received signal power, M may comprise the number of subcarriers for the received signal (RACH signal or SRS signal), $Y_m$ may comprise the determined signal level, and $P_I$ may comprise the noise to interference power. The noise to interference Power, $P_I$, may comprise:

$$P_I = \frac{1}{M-2} \cdot \sum_{m=1}^{M-2} \left\{ \frac{1}{6} |2Y'_{m+1} - Y'_m - Y'_{m+2}|^2 \right\}$$

Here, $P_I$ may comprise the noise to interference power, M may comprise the number of subcarriers for the received signal (SRS signal), $Y'_m$ may comprise a calculated signal metric (e.g., an equalized signal). For instance, $Y'_m$ may comprise $Y'_m = Y_m \times X^*_m$, where $Y_m$ may comprise the received signal level of the m-th subcarrier and $X^*_m$ may comprise the complex conjugate of the m-th subcarrier of pilot signal from the wireless device, $X_m$. In an embodiment, using the above equations the received signal levels combined with the known values (e.g., pilot signal, $X_m$), a received signal quality may be calculated for either each of the received SRS signals or for the RACH signal (e.g., SINR=$P_S/P_I$).

At step 710, a sub-band that comprises a signal level that meets the signal level criteria may be selected. For example, where wireless device 302 is instructed to transmit signals over a plurality of sub-bands, the transmissions may each be received at a received signal level (e.g., SINR). A sub-band that comprises a received signal level that meets the signal level criteria (e.g., SINR threshold) may be selected. For example, a sub-band that comprises the greatest received signal level (e.g., greatest SINR value) may be selected. In an embodiment, the sub-band that corresponds to the highest calculated received signal power may be selected. In another embodiment, a ratio of received signal power to noise and interference power may be calculated for each received signal, and the sub-band that corresponds to the highest calculated ratio may be selected.

At step 712, the wireless device may be instructed to communicate with the access node using the selected sub-band when requesting a connection. For example, wireless device 302 may be instructed to communicate with access node 304 using the selected sub-band when requesting a connection. In an embodiment, the instruction may be transmitted by access node 304, wherein the instruction comprises a Random Access Response (RAR) message. Transmissions 608 of FIG. 6 may illustrate instruction to communicate using the selected sub-band.

In an embodiment, wireless device 302 may transmit an RRC connection request over the selected sub-band in response to the instruction to communicate over the selected sub-band. Such an RRC request may be illustrated by RRC connection request 610 of FIG. 6.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 9:
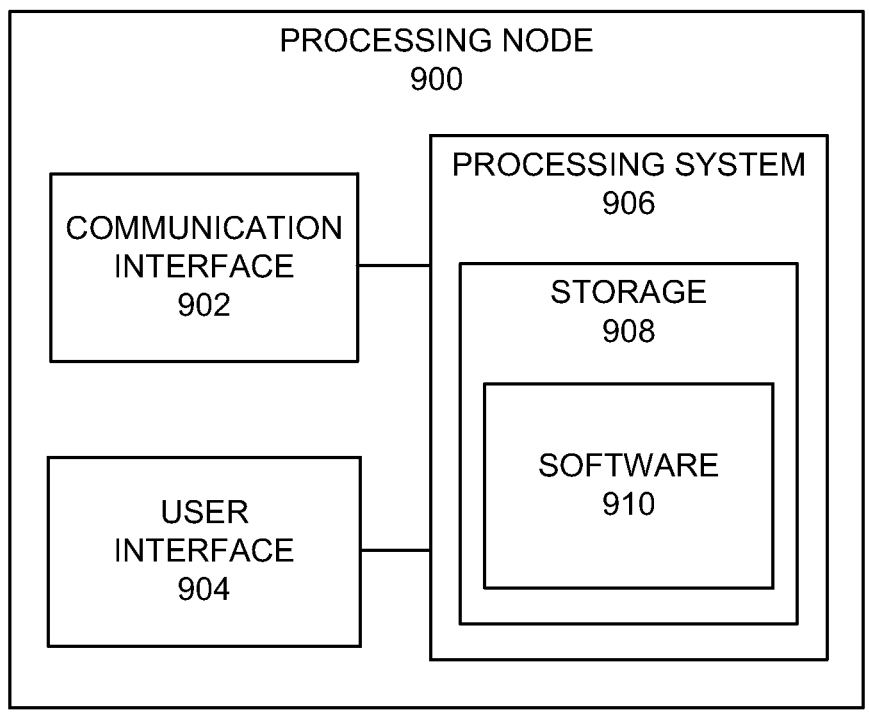
FIG. 9 illustrates an exemplary processing node.

FIG. 9 illustrates an exemplary processing node 900 in a communication system. Processing node 900 comprises communication interface 902, user interface 904, and processing system 906 in communication with communication interface 902 and user interface 904. Processing node 900 can be configured to determine a communication access node for a wireless device. Processing system 906 includes storage 908, which can comprise a disk drive, flash drive, memory circuitry, or other memory device. Storage 908 can store software 910 which is used in the operation of the processing node 900. Storage 908 may include a disk drive, flash drive, data storage circuitry, or some other memory apparatus. Software 910 may include computer programs, firmware, or some other form of machine-readable instructions, including an operating system, utilities, drivers, network interfaces, applications, or some other type of software. Processing system 906 may include a microprocessor and other circuitry to retrieve and execute software 910 from storage 908. Processing node 900 may further include other components such as a power management unit, a control interface unit, etc., which are omitted for clarity. Communication interface 902 permits processing node 900 to communicate with other network elements. User interface 904 permits the configuration and control of the operation of processing node 900.

Examples of processing node 900 include controller node 306 and gateway node 308. Processing node 900 can also be an adjunct or component of a network element, such as an element of access nodes 104 or 304 and the like. Processing node 900 can also be another network element in a communication system. Further, the functionality of processing node 900 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for sub-band selection for a wireless device during connection, the method comprising:
   receiving, at an access node, a RACH preamble message from a wireless device;
   determining that a received signal level associated with the message does not meet a signal level criteria;
   instructing the wireless device to transmit signal information to the access node, wherein the wireless device is instructed to transmit a sounding reference signal over a plurality of sub-bands;
   selecting, based on the sounding reference signal, a sub-band that comprises a signal level that meets the signal level criteria; and
   instructing the wireless device to communicate with the access node using the selected sub-band when requesting a connection.

2. The method of claim 1, further comprising selecting a sub-band that comprises a greatest received signal level.

3. The method of claim 1, further comprising:
   calculating a received signal power for each signal received from the wireless device on each sub-band, wherein the received signal power is determined based on a received signal level for each sub-band and a pilot signal power; and
   selecting a sub-band that comprises a greatest calculated signal power.

4. The method of claim 1, wherein the wireless device transmits sounding reference signals over a plurality of sub-bands based on a linear hopping pattern such that a signal is transmitted over a single sub-band for a single transmission time interval.

5. The method of claim 1, wherein instructing the wireless device to transmit signal information further comprises instructing the wireless device to transmit a sub-band channel quality indicator (CQI) report to the access node.

6. The method of claim 5, further comprising selecting a sub-band that comprises a greatest channel quality indicator from a received sub-band CQI report.

7. The method of claim 1, wherein the instruction to transmit signal information to the access node comprises a random access response (RAR) message and the instruction to communicate using the selected sub-band comprises a random access response (RAR) message.

8. The method of claim 1, further comprising receiving a RRC connection request from the wireless devices over the selected sub-band.

9. A system for sub-band selection for a wireless device during connection, the system comprising:
   a processing node with a processor configured to:
   receive, at an access node, a RACH preamble message from a wireless device;
   determine that a received signal level associated with the message does not meet a signal level criteria;
   instruct the wireless device to transmit signal information to the access node, wherein the wireless device is instructed to transmit a sub-band channel quality indicator (CQI) report to the access node;
   select, based on the received sub-band CQI report, a sub-band that comprises a signal level that meets the signal level criteria; and
   instruct the wireless device to communicate with the access node using the selected sub-band when requesting a connection.

10. The system of claim 9, wherein instructing the wireless device to transmit signal information further comprises instructing the wireless device to transmit a signal on a plurality of sub-bands.

11. The system of claim 10, wherein the processing node is further configured to select a sub-band that comprises a greatest received signal level.

12. The system of claim 10, wherein the processing node is further configured to:
   calculate a received signal power for each signal received from the wireless device on each sub-band, wherein the received signal power is determined based on a received signal level for each sub-band and a pilot signal power; and
   select a sub-band that comprises a greatest calculated signal power.

13. The system of claim 9, wherein instructing the wireless device to transmit signal information further comprises instructing the wireless device to transmit a sounding reference signal over a plurality of sub-bands.

14. The system of claim 13, wherein the wireless device transmits sounding reference signals over a plurality of sub-bands based on a linear hopping pattern such that a signal is transmitted over a single sub-band for a single transmission time interval.

15. The system of claim 9, wherein the processing node is further configured to select a sub-band that comprises a greatest channel quality indicator from a received sub-band CQI report.

16. The system of claim 9, wherein the instruction to transmit signal information to the access node comprises a random access response (RAR) message and the instruction to communicate using the selected sub-band comprises a random access response (RAR) message.

17. The system of claim 9, wherein the processing node is further configured to receive a RRC connection request from the wireless devices over the selected sub-band.

18. A method for sub-band selection for a wireless device during connection, the method comprising:
   receiving a RACH preamble message from a wireless device;
   determining that a received signal level associated with the message does not meet a signal level criteria;
   instructing the wireless device to transmit signal information to the access node, wherein the wireless device is instructed to transmit a sub-band channel quality indicator (CQI) report to the access node;
   selecting, based on the received sub-band CQI report, a sub-band that comprises a signal level that meets the signal level criteria; and
   instructing the wireless device to communicate with the access node using the selected sub-band when requesting a connection.

* * * * *